March 31, 1953 M. CAMRAS 2,633,503
AUTOMATIC STOP ARRANGEMENT FOR MAGNETIC RECORDERS
Filed Jan. 12, 1949 2 SHEETS—SHEET 1

Inventor
Marvin Camras
by The Firm of Charles H. Hill Attys.

AUTOMATIC STOP ARRANGEMENT FOR MAGNETIC RECORDERS

Filed Jan. 12, 1949 2 SHEETS—SHEET 2

Inventor
MARVIN CAMRAS by The Firm of Charles W. Hills Attys.

Patented Mar. 31, 1953 2,633,503

UNITED STATES PATENT OFFICE 2,633,503

AUTOMATIC STOP ARRANGEMENT FOR MAGNETIC RECORDERS

Marvin Camras, Chicago, Ill., assignor to Armour Research Foundation of Illinois Institute of Technology, Chicago, Ill., a corporation of Illinois Application January 12, 1949, Serial No. 70,450

9 Claims. (Cl. 179—100.2)

This invention relates to improvements in an automatic stop arrangement for magnetic recorders and the like, and more specifically, to means for automatically stopping the travel of a recording medium from one spool to another in a magnetic recorder when there is danger of the medium becoming completely unwound from one of the spools, although the invention may have other uses and purposes as will be apparent to one skilled in the art.

This application is a continuation of my copending application entitled "Automatic Stop Arrangement for Magnetic Recorders," U. S. Serial No. 523,832, filed February 25, 1944, allowed July 22, 1948, and assigned to the same assignee as the present invention.

In magnetic recorders and the like, it is frequently troublesome to find that the recording medium has been totally unwound from one of the spools. Usually the medium passes from one spool to another, being partially wound about both spools during a recording and a rewinding, and a reproducing operation. If a recording is in process, the medium may be totally unwound from the supply spool unnoticed by the operator, and a material part of the recording may not be recorded at all. Likewise, if the medium is totally unwound from the receiving spool during a rewinding operation, unwelcome difficulty is experienced in properly associating the medium with the guide, pulleys, in some instances a level wind arrangement, erasing head, recording head, and reattaching it to the receiving spool. It is also well recognized that if a medium should break during a recording, rewinding, or reproduction, all operation should immediately stop. In addition, in many cases, the recording medium itself is under tension during operation, and upon a breakage in the medium or a total unwinding of the medium from one of the spools, there is considerable danger of injury to the medium that might cause deterioration to some extent of an important part of a recording.

With the foregoing in mind, it is an important object of the instant invention to provide an arrangement capable of automatically stopping the moving parts of a magnetic recorder or reproducer when all but a predetermined length of medium has been unwound from either the supply or the receiving spool, and also effecting such stoppage of moving parts upon breakage of the medium.

Another object of the invention resides in the provision of an electrically energized arrangement for cutting off the power to the driving motor of a magnetic recorder or reproducer prior to a medium being totally unwound from either of the spools, or instantly upon breakage of the medium.

A further feature of the invention resides in the provision of an automatic stop arrangement for a magnetic recorder or reproducer which effectively stops all moving parts when the recording medium is wound nearly off one of the reels or spools.

Another feature of the invention resides in the provision of an automatic stop arrangement for a magnetic recorder or reproducer to effect a stoppage of the moving parts when the medium is about to be unwound entirely from one of the reels or spools or upon breakage of the medium, the arrangement being such that the medium itself acts as the controlling element in the functioning of the stop arrangement.

Also an object of this invention resides in the provision of an electrically controlled automatic stop arrangement for a magnetic reproducer or recorder, in which the recording medium itself is used as a conductor in the electrical circuit of the stop arrangement.

Still another object of the instant invention is the provision of automatic means to cause a stopping of moving parts of a magnetic recorder or reproducer prior to the total unwinding of the recorder medium from one of the spools, the arrangement embodying a selective control to permit resumption of operation in the same direction to totally unwind the medium from the particular spool if that is desired.

A further object of the invention resides in the provision of automatic means to stop the moving parts of a magnetic recorder or reproducer prior to the complete unwinding of the recording medium from one of the spools, or upon breakage of the medium, such means involving a selective control to permit resumption of motion in the same direction if it is desired to completely unwind the medium from one of the spools, such selective control being inoperative to effect a resumption of operation in the event of breakage of the medium.

It is a still further object of the instant invention to provide automatic stop mechanism for a magnetic recorder or reproducer to cause a stoppage of moving parts in the event of danger of unwinding a medium from a spool or upon breakage of the medium, which arrangement is positive in action, economical to produce and use, and which may be associated readily with a magnetic recorder or reproducer already built, or readily built into a magnetic recorder or reproducer during manufacture.

While some of the more salient features, characteristics and advantages of the instant invention have been above pointed out, others will become apparent from the following disclosures, taken in conjunction with the accompanying drawings, in which.

As shown on the drawings.

Figure 1:
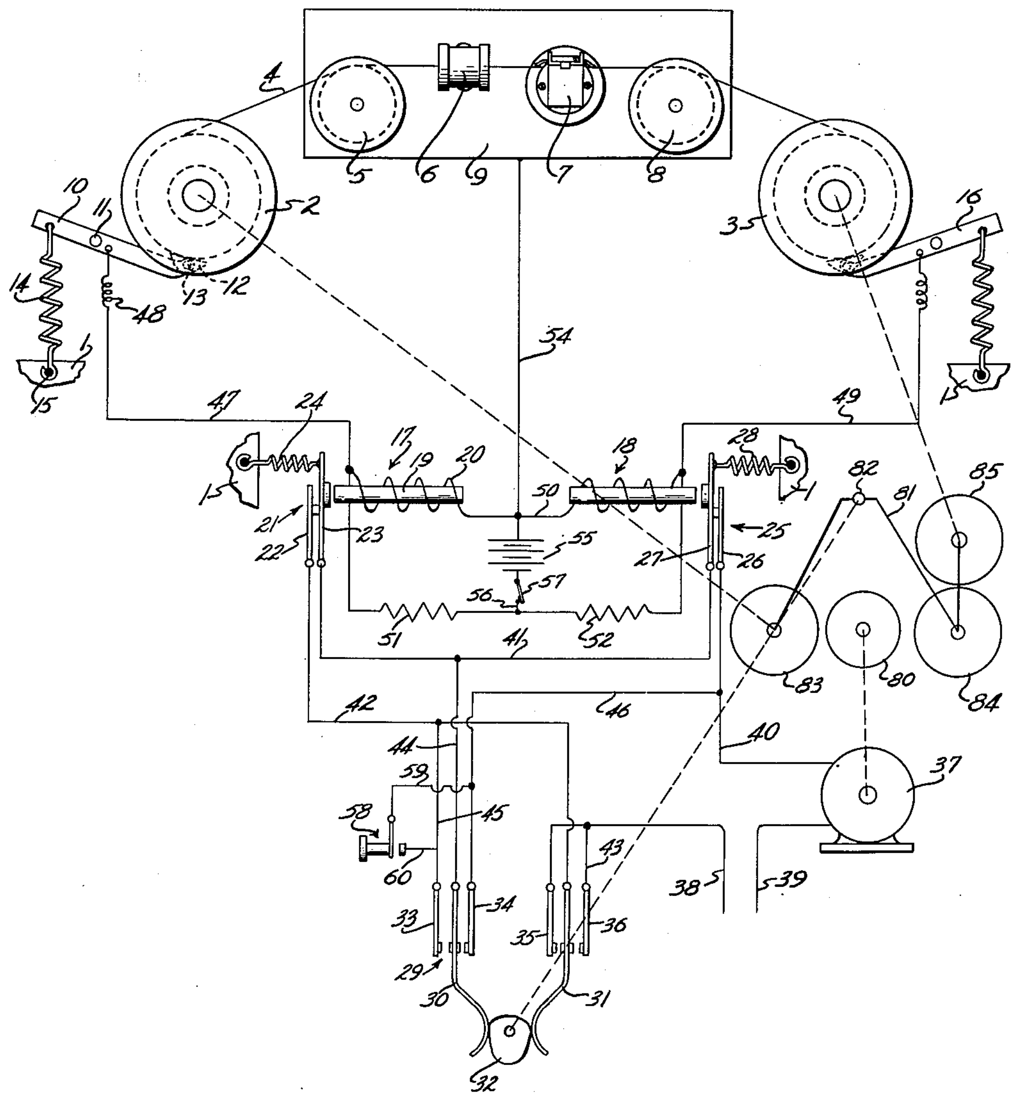
Figure 1 is a fragmentary diagrammatic view of salient parts of a magnetic recording and reproducing device including a stop arrangement embodying principles of the instant invention, with the wiring diagram of the arrangement also illustrated.
Figure 2:
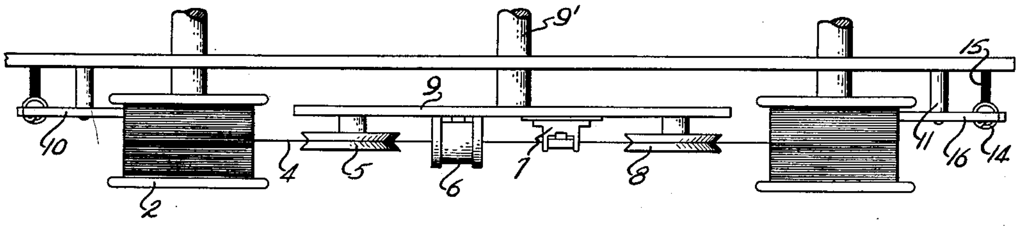
Figure 2 is a fragmentary top plan view of the structure seen in Figure 1.

In that form of the instant invention illustrated in Figures 1 and 2, certain of the salient features and most readily accessible parts of a magnetic recording and reproducing device are illustrated together with a stop arrangement diagrammatically shown. In the illustrated instance the parts of the recorder are shown associated with a supporting panel 1, and include a pair of spaced reels or spools 2 and 3 each of which is provided with a shaft extending through the panel 1 to any suitable drive connections. Carried by these spools 2 and 3 is a recording medium 4 which, in the illustrated instance, is in the nature of a relatively fine round wire of paramagnetic material. The medium or wire 4 is shown partially wound around both spools and the wire may travel from one spool to the other depending upon which direction the drive means are operating.

In the illustrated embodiment, the wire 4 travels from the reel 2 to the reel 3 when a recording is being made and when a recording is being reproduced, and for purposes of convenience this direction will be referred to as forward movement. The wire travels in the opposite direction, referred to as reverse movement, during rewinding between recording and reproducing operations.

In traveling from the reel 2 to the reel 3, the wire 4 passes over a guide pulley 5, then through the field of an erasing head 6, then in operative association with a recording or reproducing head 7, and thence over another guide pulley 8 to the reel or spool 3. The guide pulleys, erasing head, and recording head are carried on an electrically conductive sub-panel 9 mounted on a shaft 9' extending through the supporting panel 1, as seen in Figure 2. The entire sub-panel 9 together with the instrumentalities carried thereon, may be moved in and out relatively to the panel 1 by any suitable form of mechanism so as to insure a level winding of the wire 4 on either of the spools.

In usual operation, the wire is caused to travel in a forward direction, the erasing head 6 demagnetizes the wire to remove any previous recording that may be thereon, and the recording head 7 magnetizes the wire in accordance with fluctuating electrical impulses to be recorded. After a recording has been made, the wire may be rewound on the supply spool 2, and then again moved in the forward direction to the receiving spool 3 for reproduction purposes. During reproducing, the erasing head 6 is deenergized, and the recording head 7 acts as a pick-up means to transmit the impulses now caused by the magnetized wire to suitable amplifying means for reproduction of the record.

For many obvious reasons, it is desirable not to have the wire unintentionally totally unwound from one of the spools 2 or 3, and it is also desirable to stop the movement of the wire immediately if breakage of the wire should occur. Among those reasons are possible injury to the wire and especially to the part of the wire carrying an important portion of the recording, and the objectionable waste of time necessary to reassociate the wire with the guide means, recording and erasing heads, and attach it again to the spool from which it had been totally unwound. In breakage, obviously no further movement of the wire is desired until that breakage has been corrected.

To this end, like riders are associated one with each of the spools 2 and 3. These riders operate in the same manner as an electrical brush, and bear against the portion of the wire wound around the particular spool. With reference more particularly to Figure 1, it will be seen that each rider embodies a lever 10 pivoted intermediately as at 11 to the supporting panel 1. The inner end of the lever carries a substantially sector shaped shoe 12 pivoted to the lever as indicated at 13, this structure being seen in dotted lines in Figure 1. Thus, contact with the wire upon the spool may effectively be had regardless of the direction of rotation of the spool. The outer end of the lever is engaged by a tension spring 14 suitably anchored at its opposite end to an insulated stud 15 projecting from the panel 1 so that there can be no electrical connection between the spring and the panel in the event the panel is made of conductive material. Although both rider arrangements are identical, that associated with the spool 2 will be indicated by numeral 10, and that associated with the spool 3 will be indicated by number 16 for purposes of convenience in the later description as to the electrical circuit.

Also mounted in a suitable location on the panel 1 or in any other desirable location, is a pair of spaced similar relays, generally indicated by numerals 17 and 18. The relay 17 includes a paramagnetic core 19 with an energizing coil 20 wound therearound and the relay is adapted to open a switch generally indicated by numeral 21. This switch includes a stationary contact 22 and a pivotal contact 23 which functions as an armature for the relay. The switch is normally held in closed position with the aid of a spring 24 holding the armature contact 23 away from the relay into engagement with the contact 22. Upon energization of the relay, the armature contact 23 will be drawn away from the contact 22 against the action of the spring 24 to open the switch.

The relay 18 is of the same general construction as the relay 17, and is associated with a similar switch generally indicated by numeral 25 including a fixed contact 26 and an armature contact 27, this switch also normally being held in closed position by a spring 28.

Involved in the automatic stop arrangement is a control device illustrated diagrammatically near the bottom of Figure 1, which is in the nature of a cam actuated double-pole double-throw switch, generally indicated by numeral 29. This switch includes a pair of spaced switch blades 30 and 31 of flexible spring-like conductive material, and the switch blades are curved so as to always tend to ride the surface of a rotary cam 32. The switch also includes a pair of stationary contacts 33 and 34 associated with the blade 30 and a similar pair of stationary contacts 35 and 36 associated with the blade 31. As illustrated, the switch is in open position. If the cam 32 is turned substantially 90° counter-clockwise, the blade 30 will be engaged with contact 34 and the blade 31 will be engaged with contact 36 to cause travel of the recording medium 4 from the spool 2 to the spool 3. Conversely, if the cam 32 is turned substantially 90° clockwise from the position seen in Figure 1, the switch blade 30 will close the circuit with contact 33 and the switch blade 31 will close the circuit with contact 35. With the switch closed in that direction, the recording medium 4 will travel from spool 3 to spool 2.

The magnetic recording device also includes a drive motor 37, shown diagrammatically in Figure 1. This motor may be a unidirectional motor with a suitable reversing transmission between it and the shaft of the spools 2 and 3. In this instance, the automatic stop arrangement is such that when the recording medium 4 is about to become unwound totally from either of the spools 2 and 3 or in the event of breakage of the recording medium, the electric circuit to the motor is opened, and consequently all moving parts of the apparatus will cease motion. The stoppage of the moving parts is brought about automatically through an electrical circuit now about to be described.

Electrical energy is obtained from any suitable source through a pair of line conductors 38 and 39. Conductor 39 is connected to one side of the motor 37, the other side of the motor being connected to the fixed contact 26 of the switch 25 through conductor 40. The armature contact 27 of this switch is connected through conductor 41 to the armature contact 23 of the similar switch 21. A conductor 42 connects the fixed contact 22 of the switch 21 to the blade 31 of the control switch 29. The fixed contact 35 is connected to the line conductor 38, and the fixed contact 36 is connected to the same line conductor through a conductor 43. The other blade 30 of the switch 29 is connected through conductor 44 to the aforesaid conductor 41. The fixed contact 33 is connected by way of conductor 45 to the conductor 42, and the fixed contact 34 associated with this switch blade 30 is connected to the aforesaid conductor 40 by a conductor 46.

With this arrangement, assuming that the control switch 29 is set for forward movement, current will flow through the conductor 38, conductor 43, contact 36, switch blade 31 and conductor 42, through switch 21, conductors 41 and 44 to switch blade 30, and then through contact 34 and conductors 46 and 40 to the motor, and to the other side of the line 39 from the motor. It will be seen that in order to complete this circuit, switch 25 is not necessary.

In similar manner, assuming that the cam 32 is set for reverse or rewind movement of the recording medium, the current will flow from the line conductor 38 through fixed contact 35, switch blade 31, conductors 42 and 45, contact 33 and switch blade 30, conductors 44 and 41, switch 25, conductor 40 and back through the motor to line conductor 39. Switch 21 is not necessary in this instance.

It will therefore be noted that when the recording medium 4 travels from the spool 2 to the spool 3, relay control switch 21 governs the motor circuit, and when the recording medium moves in the opposite direction, the relay control switch 25 governs the motor circuit.

The relay circuit includes a conductor 47 including a pigtail 48 leading from the rider arrangement 10 associated with spool 2, and a conductor 49 with a similar pigtail leading from the rider arrangement 16 associated with spool 3. The two relay coils are connected in series by conductor 50 and paralleled across the conductors 47 and 49 with a pair of resistances 51 and 52 connected together in series by conductor 53. A conductor 54 is ground connected at one end to the sub-frame 9, and at the other end to both the conductor 50 and one side of a source of energy such as a battery 55. A conductor 56 from the other side of the battery is connected with conductor 53 between the resistances, and this conductor 56 may include a suitable switch 57 for opening the battery circuit when the device is not in use.

With this circuit arrangement, it will be noted that during normal operation, the relay coils are shorted out by the resistances 51 and 52 and conductor 53 forming an easier path for current flow than the relay coils. Current will then flow from one side of the battery through the resistance 51, conductor 47, rider 10, and the recording medium itself to the guide pulley 5 to the sub-frame 9, and back to the battery through conductor 54. On the other side of the device, the current will likewise flow through resistance 52, conductor 49, rider 16, and the recording medium itself to the guide pulley 8, through the sub-frame 9 and back to the battery through conductor 54. It should be borne distinctly in mind that in the event the recording spools 2 and 3 are not made of non-conductive material, such as a suitable plastic, then the barrel of each of these spools is insulated from the shaft of the spool. This is to prevent a grounding of the circuit through either spool.

Now assuming that the wire 4 is traveling in forward direction from the reel 2 to the reel 3, it will be noted that the rider 10 may be set to contact the wire on the spool 2 at a desired point so that there will be a few turns of wire left on that spool when the resiliently urged contact rides off the wire against the barrel of the spool, as may be seen from the showing in Figure 2. As soon as that rider passes off the wire, the above set forth circuit is opened, and in that event current will travel through the resistance 51 from one side of the battery, the adjacent portion of conductor 47, the relay coil 20, and back to the other side of the battery thus energizing the relay 17 and opening switch 21, thus breaking the circuit through the motor. Likewise, when the wire 4 travels in the opposite direction, and the rider 16 passes off the wound wire, the circuit through the wire itself is opened, and in this event current will pass through the resistance 52 from one side of the battery, a portion of conductor 49, through the coil of relay 18, and back to the other side of the battery. In this event, relay 18 is energized and switch 25 is opened, thus breaking the motor circuit. In the event the wire 4 should break, both relay circuits operate, and both switches 21 and 25 are opened simultaneously.

Sometimes it is desirable to totally unwind the wire from one of the reels because, for example, it might be desired to ship a recording to a different location. With that thought in mind, a hand operated unwind switch 58 is provided, one side of this switch connected through a conductor 59 to the aforesaid conductor 46, and the other side of the switch through a conductor 60 to the aforesaid conductor 45. Assuming that the wire has almost been unwound from spool 2 sufficiently to cause an opening of the switch 21, the motor may again be started and operation resumed in the same direction to completely unwind the wire from that spool by simply closing the switch 58. In that event the current will flow from line 38 through conductor 43, fixed contact 36, conductor 45, switch 58, conductor 46, to the motor through conductor 40, and thence to the other side of the line 39.

Likewise, if the motor has been stopped by the actuation of the relay 18, the wire may readily be totally unwound from the spool 3 by the actuation of the switch 58. In this instance, the current will flow from line conductor 38 to fixed contact 35, switch blade 31, conductor 42, conductor 45, switch 58, conductors 46 and 40 to the motor, and back to the other side of the line 39.

Thus, it will be seen that before the recording medium can be totally unwound from either of the spools, or in the event of breakage in the medium, the circuit through the motor is automatically opened, and the moving parts of the apparatus stop. At the same time, by the simple manipulation of switch 58, the wire can be totally unwound from either of the spools by the immediate resumption of operation in the previous direction, if it is so desired to unwind the wire.

In Figure 1 I have schematically and diagrammatically indicated the mechanical connections between the motor and the reels including the reversing mechanism. The motor directly drives a friction drive wheel 80 in a clockwise direction. Above the friction drive wheel 80 a yoke frame 81, pivoted at 82 for swinging movement in either direction is mounted. This frame carries a pair of fixed wheels 83 and 84 on its respective legs. A second friction wheel 85 is associated with the wheel 84 and also carried by the yoke frame. When the cam 32 is turned for forward drive, the yoke frame 81 is pivoted to the left as seen in the drawings, so that friction wheel 84 contacts friction drive wheel 80 thus causing a drive of the reel 3 by a suitable belt and pulley connection between the reel and the friction wheel 85. During this operation the reel 2 is an idler. When reverse operation is desired, cam 32 is turned in the opposite direction, the yoke frame 81 is pivoted, and the friction wheel 83 comes into contact with the friction drive wheel 80 so that the reel 2 is directly driven, the reel 3 becomes an idler, and the recording medium 4 travels from reel 3 to reel 2.

Figure 3:
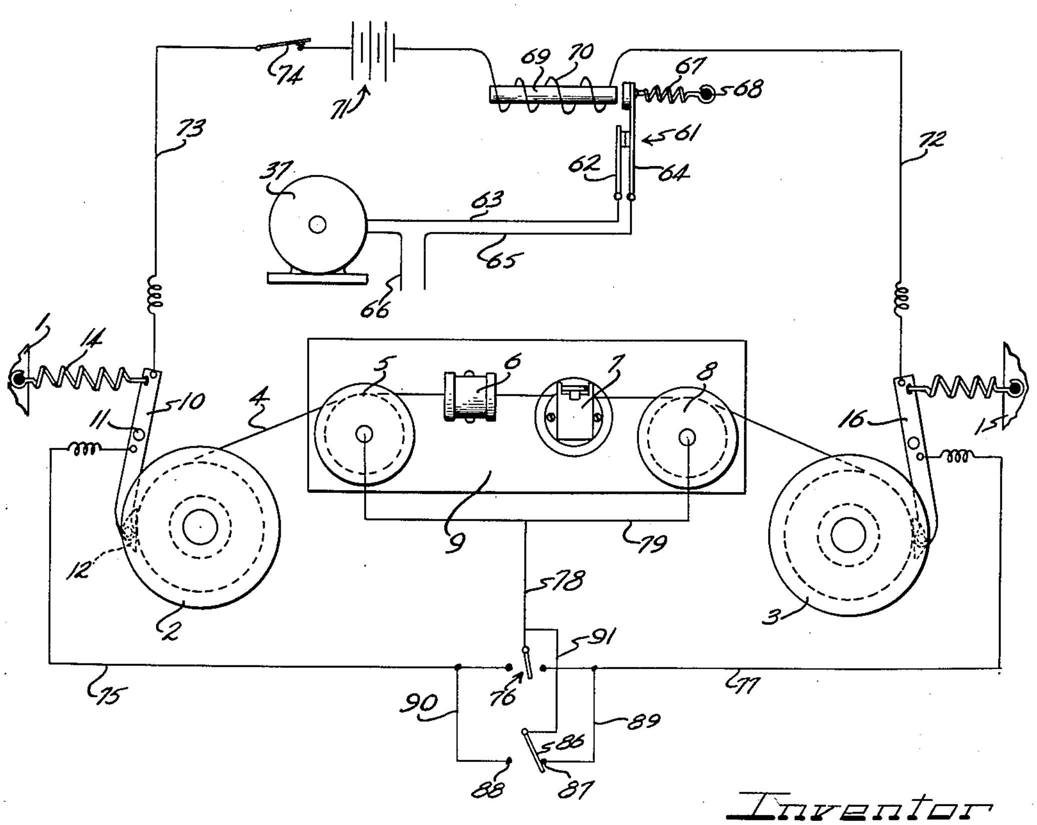
Figure 3 is a fragmentary diagrammatic view of the same character as Figure 1, but illustrating a stop arrangement embodying a somewhat different form of electrical circuit.

In Figure 3, I have illustrated the same mechanical apparatus as above described, including the same type of riders 10 and 16 for the wire on the spools 2 and 3. In this instance, however, I have associated a more simplified electrical circuit for the automatic stopping of the motor in the event of total unwinding of the wire from either spool 2 or 3 or in the event of breakage of the wire. With this circuit, only one relay control switch governing the energization of the motor 37 is utilized. This switch is generally indicated by numeral 61 and embodies a stationary contact 62 connected through a conductor 63 to the one side of the motor, and a pivotal armature contact 64 connected to a line conductor 65. The other side of the motor is connected to a line conductor 66. Consequently, with the switch 61 in closed position as illustrated the motor is energized.

The armature contact 64 of the switch 61 has associated therewith a spring 67 connected to an insulated stud 68 and normally tending to hold this switch in open position. The switch is maintained closed by a relay including a paramagnetic core 69 and a coil 70 wound therearound. One end of this coil is connected to a suitable source of energy such as a battery 71. The other end of the coil is connected through a conductor 72 having a pigtail formation through the rider 16 associated with spool 3. The opposite side of the battery 71 is connected through a conductor 73 to the rider 10 associated with the spool 2. The conductor 73 may include a switch 74 to open the battery circuit when the device is not in use.

In the arrangement just above described, current flows from one side of the battery through conductor 73, rider 10, the recording medium 4 itself to the rider 16 on the other spool 3 and back to the battery through conductor 72 and relay coil 70. Thus, the relay is energized, maintaining the switch 61 in closed position against the action of the spring 67. In the event the rider 10 passes off the wire on spool 2, the circuit is opened, the relay deenergized, and the spring 67 opens the switch 61, deenergizing the motor. The same result happens if the rider 16 associated with spool 3 passes off the recording medium on that spool.

Circuit means are provided to resume operation in the previous direction, in the event it is desired to totally unwind the recording medium from one of the spools. To this end, a conductor 75 is connected between the rider 10 and one terminal of a double throw switch generally indicated by numeral 76. The other terminal of this switch is connected through conductor 77 to the rider 16. The switch blade is connected by way of a conductor 78 to a conductor 79 between the shafts of the guide pulleys 5 and 8.

Assuming that the recording medium was traveling in the forward direction, from spool 2 to spool 3, and the rider 10 passed off the medium, it is a simple expedient to close the switch 76 with conductor 75, so that the circuit will be closed through this conductor, the lever of the rider 10, conductor 73, the battery and relay, conductor 72, the rider 16, through the medium itself to the guide pulley 8, and through conductors 79 and 78 from this pulley back to the conductor 75. In similar manner, if the wire is traveling in the opposite direction, and the rider 16 passes off the wire, the switch 76 may be closed with the conductor 77 and the relay will be energized to again close the switch 61 governing the motor circuit.

Means are provided, of course, to commence reverse winding of the recording medium after the motor has been automatically stopped by either of the riders 10 or 16 passing off the medium on the respective reels 2 and 3 while a small quantity of wire still remains on reels 2 or 3, respectively. These means include a switch 86 having a pair of contacts 87 and 88 associated with it. These contacts are connected respectively by conductors 89 and 90 to conductors 77 and 75 in parallel with the switch 76. The switch blade itself is connected through conductor 91 to conductor 78. During operation of the medium in the forward direction, from spool 2 to the spool 3, the switch 86 remains closed with contact 87, as illustrated. Then, in the event the rider 10 runs off the medium on the spool 2 and the motor is automatically stopped, it is a simple expedient to reverse the switch 86 and bring it in circuit connection with contact 88 to commence reverse winding of the medium from the spool 3 to the spool 2. In this instance, the circuit would be completed from the battery through conductor 73, rider 10, conductor 75, conductors 90 and 91, and thence through conductors 78 and 79, the medium itself, rider 16, and conductor 72 and the relay coil 70 back to the opposite side of the battery, thus causing the relay to close switch 61 and again energize the motor. The mechanical means by which the reverse drive is obtained is substantially the same as that illustrated in Figure 1, with the switch 86 mechanically coupled to the friction drive mechanism. Obviously, the switch 86 remains in circuit connection with contact 88 during reverse movement of the recording medium, and in the event the rider 16 passes off the medium, forward drive may again be established by moving the switch 86 into circuit connection with contact 87.

With this particular arrangement, it will be noted that in the event of breakage of the wire, the switch 76 will be in nearly every case ineffective for the resumption of operation. This is because upon breakage, the wire, or both the ends thereof, will separate from the pulleys 5 and 8, and therefore it would be impossible to resume operation until the break has been repaired.

It will be appreciated that a source of alternating current may be used in lieu of the batteries 55 and 71 and this source may be the same as that energizing the motor stepped down through a transformer if desired, the illustrated showing being diagrammatic.

From the foregoing, it is apparent that I have provided novel and automatically operable stop arrangement to prevent the unintentional total unwinding of a recording medium from one of the spools, the arrangement functioning effectively regardless of direction of travel of the medium. Further, in the event of breakage the arrangement also functions to stop the moving parts of the apparatus. It will be noted that the invention involves provision of means to selectively resume operation in the event it is desired to totally unwind the medium from one of the spools. Further, in one of the illustrated instances, the means for resuming operation are ineffective in the event breakage of the recording medium occurs. It will additionally be noted that the automatic stop arrangement may be readily built into a magnetic recording device during manufacture, or may readily be installed upon a device already manufactured, the invention being economical both to construct and use.

It will be apparent to those skilled in the art that in the apparatus of the present invention, the control current passing through medium 4 does not traverse the portions thereof adjacent to and over the electromagnetic transducer head 1. Consequently, there is no tendency for this control current flow to influence the magnetic field about the head or to induce any voltages in the windings thereof and no interference with the operation of the mechanism as a magnetic recorder or reproducer results from the presence of these currents.

In the appended claims, I have used the term "magnetic recording device" or "magnetic recorder" to denote mechanism operable to impart variations in the degree of magnetization of a lengthy magnetizable record medium along its length or mechanism to reproduce as intelligence, the intelligence so recorded and/or mechanism selectively operable to achieve either of these actions.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a magnetic recording device, a pair of rotary spools, a magnetizable recording medium carried by said spools and movable from one to the other thereof, an electrically driven prime mover in driving connection with said spools, an electrical circuit arrangement including said prime mover, a relay controlled switch in said circuit arrangement, a control circuit including said recording medium as a conductive part thereof, means including a relay in said control circuit for controlling said switch, and contact means conductively engaging a portion of the medium wound on each spool to complete said control circuit through the medium, said control means being disposed against said medium such that said contact means loses contact with said medium before complete unwinding of said medium from its associated spool, said relay governing said switch to open the prime mover circuit when the medium is unwound sufficiently from either spool to separate from the respective contact means and upon breakage of the medium to open the control circuit.

2. In a magnetic recording device, a pair of rotary spools, a magnetizable recording medium carried by said spools, and movable from one to the other thereof, an electrically driven prime mover in driving connection with said spools, an electrical circuit arrangement including said recording medium as a conductive element and said prime mover, and means contacting a portion of the medium on each spool arranged to lose contact with said medium at a predetermined time before complete unwinding of the record medium to cause deenergization of said prime mover, and manually operable switch means to selectively energize said prime mover to cause a resumption of operation in the original direction of travel of the medium.

3. In a magnetic recording device, a pair of spaced spools, a magnetizable recording medium carried by said spools and movable from one to the other thereof in either direction, an electrical circuit including said medium as a conductive part thereof, contact means at each spool closing the circuit through said medium, a pair of relays in said circuit one for each said contact means, means normally shorting the circuit across said relays, the circuit being arranged to energize either of said relays when the contact is broken between the medium and the respective said contact means, a prime mover in driving connection with said spools, a circuit for energizing said prime mover, and a switch in said prime mover energizing circuit for each of said relays, said switches being normally closed but responsive to the energization of said relays to open the prime mover energizing circuit.

4. In a magnetic recording device, a pair of spaced spools, a magnetizable recording medium carried by said spools and movable from one to the other thereof in either direction, an electrical circuit including said medium as a conductive part thereof, contact means at each spool closing the circuit through said medium until shortly before the medium would be completely unwound from one of said spools, a relay in said circuit, a prime mover in driving connection with said spools, a circuit for energizing said prime mover, and a switch resiliently urged to open position in said prime mover circuit normally maintained closed by said relay, and an auxiliary circuit arranged to by-pass either of said contact means, and a selectively operable switch in said auxiliary circuit to reenergize said relay and again close said prime mover circuit.

5. In a magnetic recording device, a movable magnetizable recording medium carried by a pair of reels, an electrically driven prime mover driving said reels, means for electrically contacting all but the terminal portion of said medium while said medium moves in one direction, an electrical circuit arrangement including a free portion of said medium and said means and arranged to energize said prime mover, and means in said circuit arrangement to cause deenergization of said prime mover when the circuit is broken through said medium, the last said means functioning upon a failure of the first said means to contact said medium and also upon a breaking of said medium at any time, and circuit means including switch means arranged to short out that portion of said electrical circuit arrangement which includes said free portion of said medium to thereby selectively energize said prime mover to continue movement of said medium in the same direction after the prime mover has been stopped by failure of contact of the first said means with the medium.

6. In a magnetic recording device, a pair of rotary spools, a magnetizable record medium carried by said spools and movable from one to the other thereof, an electrically driven prime mover in driving connection with said spools, an electrical circuit arrangement including said prime mover, a relay controlled switch in said circuit arrangement, a control circuit for energizing said first named circuit including a portion of said recording medium as a conductive part thereof, means including a relay in said control circuit for controlling said switch, contact means conductively engaging that portion of the medium wound on each spool to complete said control circuit through the medium, said relay governing said switch to open the prime mover circuit when the medium is unwound sufficiently from either spool to separate from the respective contact means and upon breakage of the medium to open the control circuit, an electromagnetic transducer head, and means sustaining said head to engage said medium in the region thereof between said spools but in spaced relation with the portion thereof constituting said conductive part of said control circuit.

7. In a magnetic recorder of the type wherein a lengthy conductive magnetizable record medium is utilized, an electromagnetic transducer head, means to cause travel of said medium across said head, a conducting member in engagement with said medium at one side of said head, a spool upon which said medium is wound on said side of said head, said spool having a conducting portion in engagement with said medium, and an electrical control mechanism including the portion of said medium between said member and said spool as a conducting part thereof to detect breakage thereof during the passage of said medium.

8. In a magnetic recorder of the type wherein a lengthy conducting magnetizable record medium is utilized, an electromagnetic transducer head, means to cause travel of said medium over said head, and an electrical control mechanism including a portion of said medium as a conducting part thereof to detect breakage thereof during the passage of said medium, said control mechanism including elements defining a path for current flow in parallel with the current path defined by the portions of said medium adjacent said head and having low impedance relative to the impedance of said portion of said medium.

9. In a magnetic recording device, a pair of rotary spools, a magnetizable record medium carried by said spools and movable from one to the other, an electromagnetic transducer head disposed adjacent the path of travel of said medium and across which said medium passes in traveling between said spools, an electrical control mechanism including a control circuit having a portion of said medium as a conductive part thereof to detect breakage during the passage of said medium, said portion being between one of said spools and an intermediate portion of said medium lying between said spools.

MARVIN CAMRAS.

REFERENCES CITED

The following references are of record in the file of this patent:

UNITED STATES PATENTS

| Number | Name | Date |
|---|---|---|
| 2,177,475 | Martindell | Oct. 24, 1939 |
| 2,422,143 | Somers | June 10, 1947 |
| 2,424,498 | Nygaard | July 22, 1947 |
| 2,509,017 | Sear | May 23, 1950 |

FOREIGN PATENTS

| Number | Country | Date |
|---|---|---|
| 544,760 | Great Britain | Apr. 27, 1942 |
| 582,383 | Germany | Aug. 14, 1933 |